April 15, 1924.
A. F. SCHUMACHER
SLIDING VALVE
Filed June 21, 1922
1,490,189
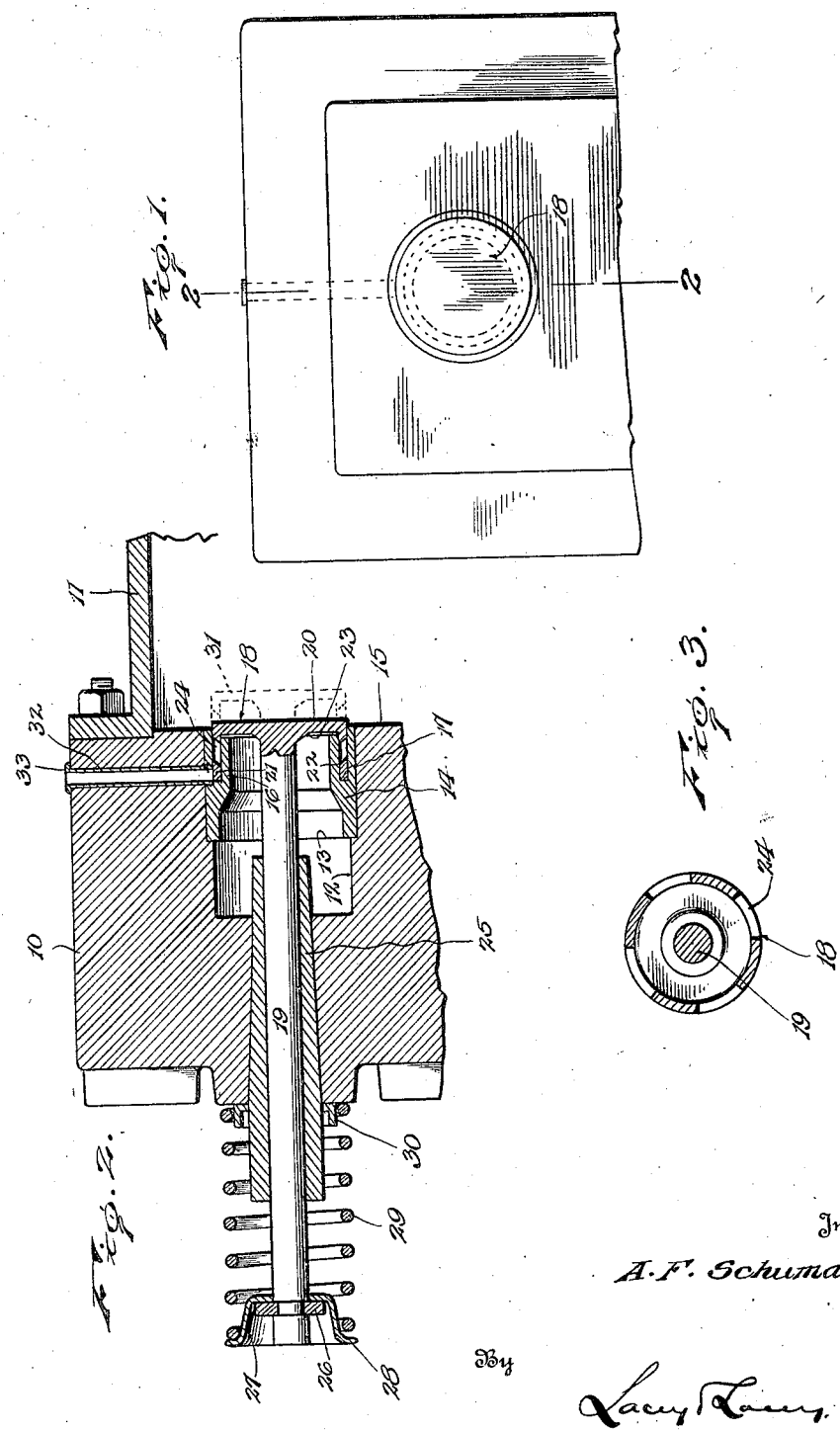
Inventor
A. F. Schumacher.
By Lacy & Lacy, Attorneys Patented Apr. 15, 1924.

1,490,189

UNITED STATES PATENT OFFICE.

ALVIN F. SCHUMACHER, OF WATERTOWN, WISCONSIN.

SLIDING VALVE.

Application filed June 21, 1922. Serial No. 570,041.

*To all whom it may concern:*

Be it known that I, ALVIN F. SCHUMACHER, a citizen of the United States, residing at Watertown, in the county of Dodge and State of Wisconsin, have invented certain new and useful Improvements in Sliding Valves, of which the following is a specification.

The present invention relates to intake and exhaust valves for internal combustion engines in general, but is more particularly intended for gasoline engines of the so-called overhead valve types, whether large or small and with any number of cylinders.

The principal object of this invention is to prevent the accumulation of foreign matter, particularly carbon, in the valve seat, this being the main trouble experienced in most of standard valves. This difficulty is avoided in the present invention by preventing any intake or exhaust of combustible fluid from reaching the seat of the valve. Furthermore, on account of the sliding motion of the valve, which tends to automatically and constantly clean the surface of the seat, the accumulation of any foreign matter is impossible.

Another object of the invention is to eliminate all leakage and consequent compression loss, by arranging the port openings of the valve in such a manner, that they are completely covered when the valve is seated. These port openings are accordingly of substantially the same extent in axial direction, as the "lift" of the valve.

In the accompanying drawing one embodiment of the invention is illustrated.

Figure 1 is a fragmentary bottom plan view of the cylinder head of an internal combustion engine;

Fig. 2 is a section on the line 2—2 of Fig. 1, and

Fig. 3 is a transverse section of the valve piston.

In the drawing, the reference numeral 10 represents a cylinder head on a cylinder block 11, which are securely fastened together. The construction of the intake and exhaust valves is the same so that only one need to be described.

In the cylinder head 10 is formed a valve chamber 12 opening inwardly or to the right, as seen in Fig. 2, and a narrow ledge is shown about half way in in the cylindrical wall of the chamber forming a shelf or bearing 13 for the sleeve 14 which is pressed in tightly in the chamber and is flush with the inner face 15 thereof. The sleeve is furnished with an inner cylindrical wall 16 between which and the outer wall of the sleeve is provided an annular groove 17 forming the valve seat. It should be noted that the inner wall does not extend inwardly as far as the face 15 of the chamber, but is slightly spaced therefrom for a purpose which will be explained later on.

The reference numeral 18 represents the piston head which is integral with the valve stem 19 or securely fastened thereon. This piston head has a flat end face 20 and a cylindrical flange 21, which fits snugly in the groove or seat 17, between the outer and inner walls of the sleeve 14, and the edge of the flange is intended to bottom in this seat. A small space 22 is formed between the edge of the wall 16 and the inner face 23 of the piston head. It will be noted that by means of this arrangement, when the edge of the wall or cylindrical flange 21 abuts against the bottom of the groove or seat 17, there is still a clearance between the edge of the inner wall 16 and the opposing surface of the valve piston.

The cylindrical flange 21 of the piston is provided with one or more slots 24 which constitute the valve ports, four being shown on the drawing. These slots are preferably inclined about 45° against the axis of the piston and extend in axial direction an amount approximately the same as, or slightly less than the "lift" of the piston during opening and closing. The edges of the slots 24 are located a little below the surface 15 of the valve chamber so that, when the piston is in seated position, that is, when the valve is closed, the slots 24 are completely covered by the walls of the sleeve 14.

The stem 19 of the valve is carried slidably in a guide 25 secured in the cylinder head and preferably extending beyond the end thereof, as seen in Fig. 2. The end of the stem 19 carries, rigidly secured thereon, a washer 26 retaining a cup 27 in position thereon. This cup 27 is flared outwardly to form a narrow ledge 28 engaging one end of a coiled compression spring 29 which at its other end engages with the face of the cylinder head 10 and is held in position by means of another washer 30 fitting around the guide 25. This is the usual construction of a valve of this class and it is regulated by means of any suitable kind of governor in the usual manner which for this reason has not been shown in the drawing. The "lift" of the valve is in this case shown to be about three-sixteenths of an inch but can, of course, be made to suit conditions and to be increased or decreased as required. The dot and dash lines in Fig. 2 represent the open position of the piston as indicated at 31 when, of course, the ports 24 are entirely uncovered permitting the entry or exhaust of combustion fluid through the ports.

In order to avoid the creation of a vacuum in the valve seat, a passage communicating with the atmosphere is provided near the bottom of the seat, and this is preferably accomplished by means of a small tube 32 tapped into the outer wall of the valve sleeve 14 and extending through the wall of the cylinder head 10 where it is preferably riveted, as at 33. This tube also serves the purpose of securing the valve sleeve 14 in position, so that it can neither turn nor move in axial direction in the chamber 12. It will now be evident that no combustion gases can ever enter into the grooved seat 17 formed in the valve sleeve 14 and for that reason no carbon can collect therein. Moreover, in case grit or any other foreign matter should accidentally get into the grooved seat 17, it will be immediately removed by the sliding of the cylindrical wall 21 of the valve piston. Furthermore, as this wall fits snugly in the seat, there is no possibility of leakage with consequent loss of compression.

Beside the use of the tube 32 for inlet and outlet of air into and out of the valve seat 17, this tube may also serve as a means for lubricating the seat by squirting oil through the same so as to permit a free movement of the valve piston and prevent wear.

When building new engines it is not necessary to supply the sleeve 14, as the chamber 12 may take the contour of the inner sleeve walls and a groove seat provided around the chamber at the outer end of the cylinder head.

Having thus described the invention, what is claimed as new is:

A valve for internal combustion engines having a cylinder head with a cylindrical chamber, a sleeve inserted in said chamber, spaced outer and inner walls on said sleeve forming an annular valve seat between them; alined apertures being provided in said head and the outer wall of said sleeve at the bottom of said seat, a valve piston with an annular flange having slidable engagement in said seat and provided with inclined apertures adapted to be concealed by said walls when the valve is closed, a tube inserted in said apertures and adapted to lock said sleeve in the cylinder head; whereby the creation of vacuum in said seat is prevented.

In testimony whereof I affix my signature.

ALVIN F. SCHUMACHER. [L. S.]